Sept. 1, 1936. C. V. MUNSON 2,052,936
FEEDING MECHANISM
Filed July 11, 1935 2 Sheets-Sheet 1
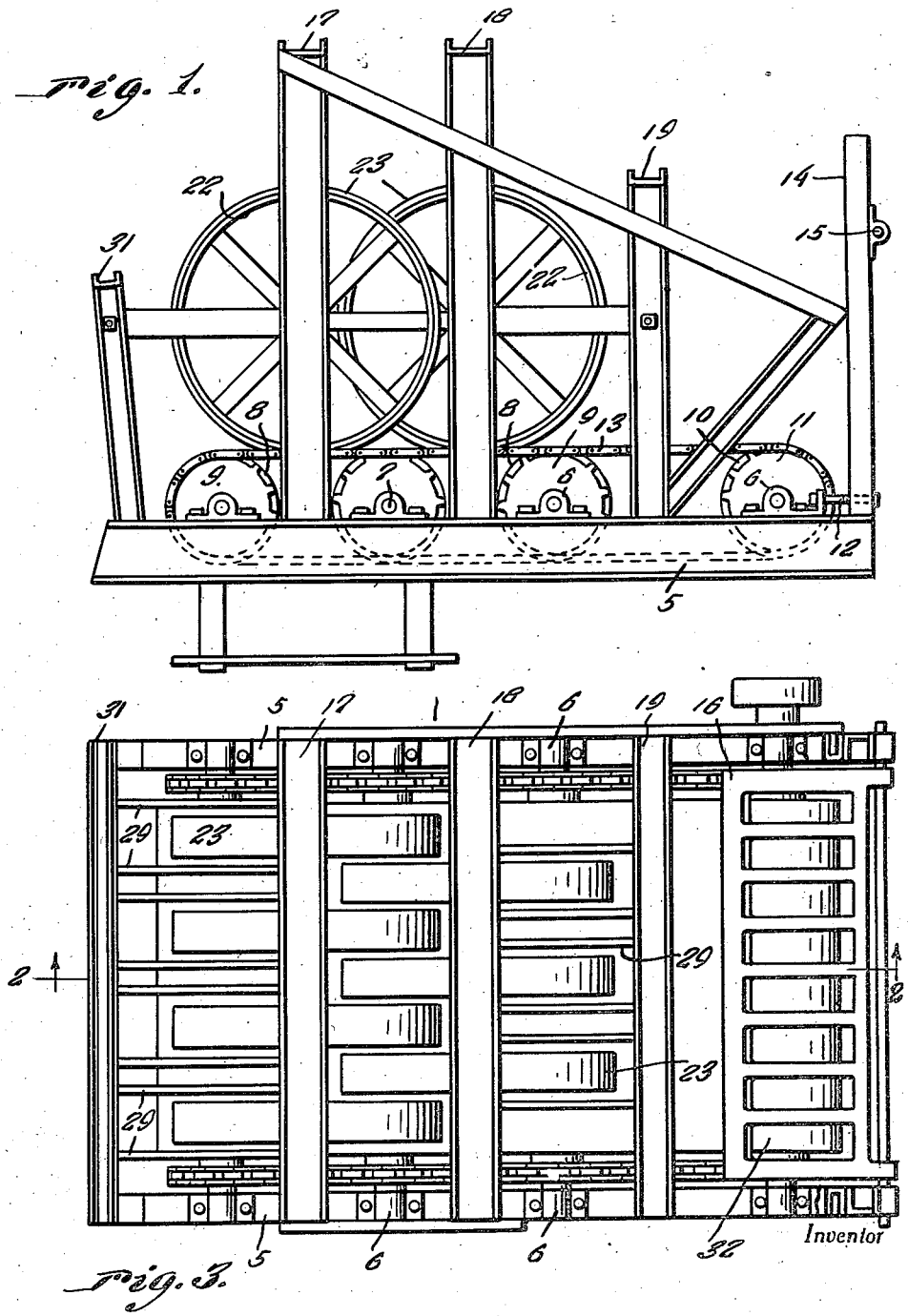

Sept. 1, 1936.    C. V. MUNSON    2,052,936
FEEDING MECHANISM
Filed July 11, 1935    2 Sheets-Sheet 2
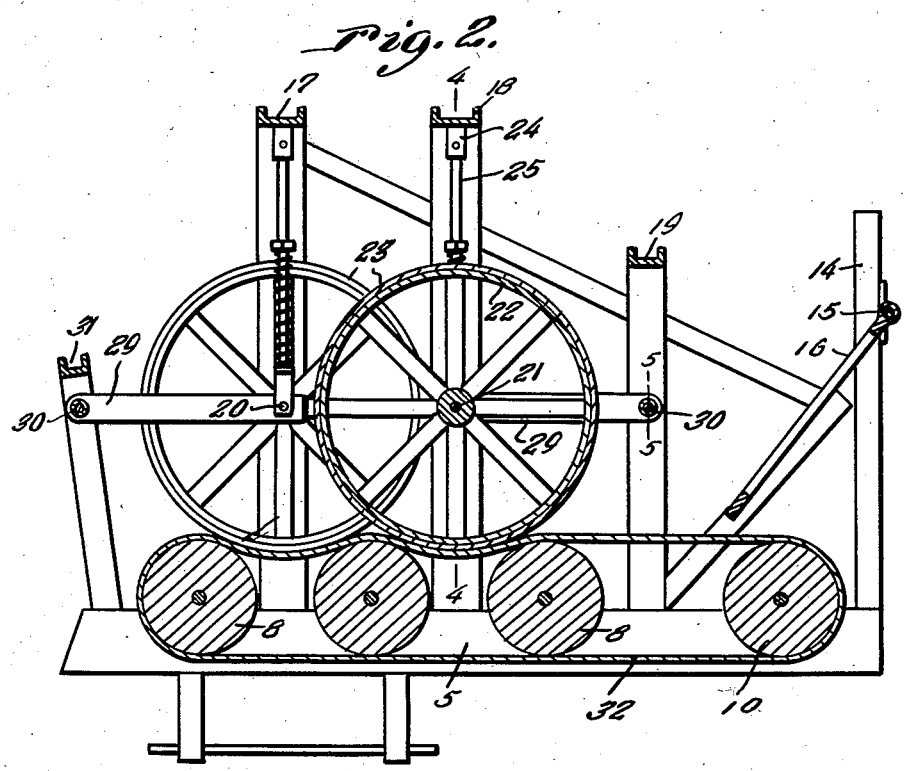
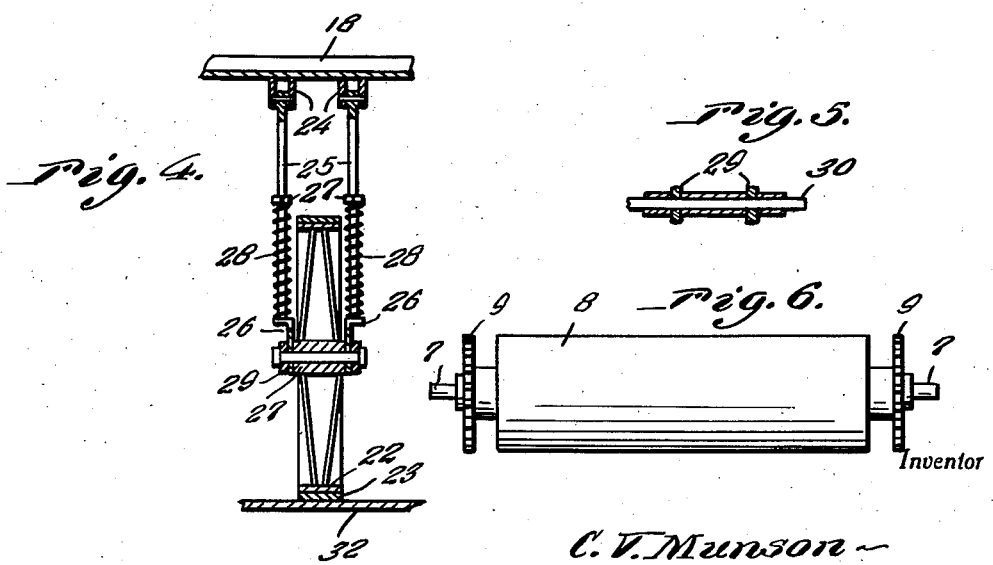
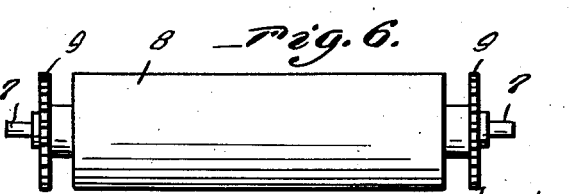
Inventor
C. V. Munson
By Clarence A. O'Brien
Attorney Patented Sept. 1, 1936

2,052,936

UNITED STATES PATENT OFFICE 2,052,936

FEEDING MECHANISM

Clarence Victor Munson, El Centro, Calif.

Application July 11, 1935, Serial No. 30,940

2 Claims. (Cl. 130—13)

This invention appertains to new and useful improvements in feeding mechanisms for flax or grain thrashing machines.

The principal object of the invention is to provide a machine whereby the flax or grain pods can be crushed without mutilating the straw or crushing the seed as it is fed to the threshing machines.

Another important object of the invention is to provide a crushing feeder of the character stated which can be readily attached to any make of threshing machine.

Other important objects and advantages of the invention will become apparent to the reader of the following specification.

In the drawings:

Figure 1 represents a side elevational view of the mechanism.

Figure 2 represents a longitudinal vertical sectional view taken substantially on line 2—2 of Figure 3.

Figure 3 represents a top plan view of the mechanism.

Figure 4 represents a fragmentary sectional view taken substantially on line 4—4 of Figure 2.

Figure 5 represents a fragmentary detail sectional view taken substantially on line 5—5 of Figure 2.

Figure 6 represents a side elevational view of one of the rolls.

Referring to the drawings wherein like numerals designate like parts, it can be seen that the mechanism includes a base made up of the side beams 5—5. Bearings 6 are secured to the tops of these beams to receive the pintle ends 7 of the rolls 8. Each end of each of these rolls 8 is provided with a sprocket wheel 9. Between the beams 5 and one end of the base is an auxiliary roll 10 having pintle ends disposed through certain of the bearings 6 and provided with sprocket wheels 11. The bearings 6 upon which this roll 10 is supported are slidably adjustable on the beams 5 and capable of being adjusted by the screw adjustment means 12 to the end that the sprocket chain 13 which is trained over the gears 9 and 11 at each side of the machine can be tightened to the desired degree.

An upright structure 14 at front end of the device supports the shaft 15, which carries band cutter or feeder knives, guarded by grilled plate 16. Inverted U-shaped channel members 17, 18, 19 and 31 have their lower ends secured to the beams 5.

These U-shaped structures 17—18 serve to support the shaft 20—21 which supports the wheels 22, each of which is provided with a leather or rubber tire 23.

Gear members 24 depending from the upper portions of the supporting structures 17—18 have their upper ends of the rods 25 pivotally connected to the same. These rods extend downwardly and through openings in lug members 26—26 on the hub 27 of each wheel 22. Each of these rods 25 is provided with an adjustable stop collar 28 between which and the corresponding lug 26 a coiled compressible spring 28' is positioned to regulate all wheels 22 as to tension.

Arm members 29 extend horizontally from rods 30 on the upright supports 19—31 to engage with the hubs 27 of the wheels 22 to hold the same in proper interlapping relation as suggested in Figure 3.

An endless web 32 is trained over the rolls 8 and 10 with the wheels 22 bearing against the same in the manner shown in Figure 2.

While the foregoing specification sets forth the invention in specific terms, it is to be understood that numerous changes in the shape, size and materials may be resorted to without departing from the spirit and scope of the invention as claimed hereinafter.

Having thus described the invention, what is claimed as new is:

1. A crushing feeder of the character described comprising a base, a plurality of rolls rotatably mounted on the base, an endless web disposed over and under the said rolls, upright structures, a plurality of wheel-like structures adapted to bear against the web and be supported by certain of the rolls, spring means associated with the wheel-like structures for urging the same downwardly against the web, said wheel-like structures being arranged in a pair of rows with the wheels of the rows in interlapping relation.

2. A crushing feeder of the character described comprising a base, a plurality of rolls rotatably mounted on the base, an endless web disposed over and under the said rolls, upright structures, a plurality of wheel-like structures adapted to bear against the web and be supported by certain of the rolls, spring means associated with the wheel-like structures for urging the same downwardly against the web, said wheel-like structures being arranged in a pair of rows with the wheels of the rows in interlapping relation, and retaining arms for the wheel-like structures for retaining the same in proper interlapping relation.

CLARENCE VICTOR MUNSON.